United States Patent [19]
Saito et al.

[11] Patent Number: 6,085,020
[45] Date of Patent: Jul. 4, 2000

[54] EDITING CONTROL APPARATUS AND EDITING CONTROL METHOD EMPLOYING COMPRESSED AUDIO-VISUAL INFORMATION

[75] Inventors: Kenji Saito, Katano; Hiroshi Ikeda, Hirakata, both of Japan

[73] Assignee: Matsushita Electric Industrial Co., Ltd., Osaka-fu, Japan

[21] Appl. No.: 09/248,402

[22] Filed: Feb. 12, 1999

Related U.S. Application Data

[63] Continuation of application No. 08/844,212, Apr. 18, 1997, abandoned.

[30] Foreign Application Priority Data

Apr. 23, 1996  [JP]  Japan  .................................. 8-100922

[51] Int. Cl.[7] .................................................. H04N 5/76
[52] U.S. Cl. ................................................. 386/54; 386/55
[58] Field of Search .................................. 386/4, 52, 55, 386/64–65, 54; 345/328; 360/13; 369/83; H04N 5/76, 5/92

[56] References Cited

U.S. PATENT DOCUMENTS

| | | |
|---|---|---|
| 4,754,342 | 6/1988 | Duffy . |
| 4,974,178 | 11/1990 | Izeki et al. . |
| 5,129,036 | 7/1992 | Dean et al. . |
| 5,218,672 | 6/1993 | Morgan et al. . |
| 5,231,512 | 7/1993 | Ebihara et al. . |
| 5,339,166 | 8/1994 | LeBrat et al. . |
| 5,469,270 | 11/1995 | Yamamoto . |
| 5,553,221 | 9/1996 | Reimer et al. . |
| 5,568,275 | 10/1996 | Norton et al. . |
| 5,646,931 | 7/1997 | Terasaki . |
| 5,649,171 | 7/1997 | Craven et al. . |

FOREIGN PATENT DOCUMENTS

| | | |
|---|---|---|
| 0 601 749 A1 | 6/1994 | European Pat. Off. . |
| 0 715 460 A1 | 6/1996 | European Pat. Off. . |
| WO 93 08664 | 4/1993 | WIPO . |
| WO 93 21732 | 10/1993 | WIPO . |
| WO 95 25400 | 9/1995 | WIPO . |

OTHER PUBLICATIONS

Nowara, Th., "Halzbeit In Der Digitalen Nonlinearen Nachbearbeitung. Praxisnahe Betrachtungen Und Systemumberblick", Fernseh Und Kinotechnik, vol. 49, No. 12, pp. 715–720, 722–726,728–734.

*Primary Examiner*—Thai Tran
*Attorney, Agent, or Firm*—Akin, Gump, Strauss, Hauer & Feld, L.L.P.

[57] ABSTRACT

The present invention provides an editing control apparatus that enables editing work to be done in a short time on AV information for news programs and the like and, if there is time left, saves the finished edit information and allows easy checking to see if better editing is possible on the basis of the edit information. The editing control apparatus of the present invention stores AV information on a fast-access recording medium such as a hard disk, and completes editing by just creating an EDL. The editing control apparatus also allows the creation of a plurality of EDLs.

9 Claims, 10 Drawing Sheets

EDITING CONTROL APPARATUS AND EDITING CONTROL METHOD EMPLOYING COMPRESSED AUDIO-VISUAL INFORMATION

CROSS REFERENCE TO RELATED APPLICATION

This application is a continuation of application Ser. No. 08/844,212 filed Apr. 18, 1997 entitled: "EDITING CONTROL APPARATUS AND EDITING CONTROL METHOD" now abandoned.

BACKGROUND OF THE INVENTION

The present invention relates to an editing control apparatus used for editing audio-visual (AV) information.

Generally, editing of AV information using a conventional editing control apparatus is performed by connecting a playback VCR (video cassette recorder) and a record VCR to the editing control apparatus. In such editing, a playback tape on which various pieces of AV information are recorded is set in the playback VCR, while a record tape for recording edited AV information is loaded into the record VCR. Editing of AV information is done by recording only necessary materials, which are selected from the various pieces of AV information obtained, onto the record tape in the desired order by using the record VCR. In this editing work, playback start positions (P-IN points) and playback end positions (P-OUT points) on the playback tape on which the various pieces of AV information are recorded, and record start positions (R-IN points), etc. on the record tape, are each treated as one unit of edit information (one event information unit), and these event information units are recorded in the desired order on the record tape.

The word "event" here represents one unit of image information in AV information, and refers, for example, to image information of one scene. In the above example, one event refers to AV information recorded between the playback start position (P-IN point) and playback end position (P-OUT point) on the playback tape.

In this way, a plurality of event information are recorded on the record tape in order of play back, and an edit decision list (hereinafter abbreviated EDL) is created. Besides the playback start positions (P-IN points) and playback end positions (P-OUT points) on the playback tape and the record start positions (R-IN points) on the record tape, transition mode information indicating a change from the immediately previous event to the current event (for example, information indicating a cut at which the entire screen changes from one scene to another instantaneously, or a special transition effect such as a wipe or a fade) is also treated as one event information unit. In the EDL, a plurality of such event information units are recorded in order of play back.

In the editing of AV information for news programs, such editing work must be done within a short limited time so as to ensure the presentation of appropriate AV information material for display on the screen in correct timing with the narration being read by an announcer. In such editing work, the editor assembles event information while viewing AV information material. Previously, it has been standard practice to first assemble the event information in the editor's mind and then start editing work using a conventional editing control apparatus. After completing the editing work, however, there has often been the case that the editor has to work on corrections to the completed EDL until the deadline to see if the edit can be further improved.

When editing AV information in this way by recording on the record tape using the conventional editing control apparatus, the editing work required at least recording time for recording on the record tape. Further, when executing a revision works using a tape as a recording medium, if a time duration of a revision portion on the tape (the tape length of the revision portion) is different from the time duration on the tape before the revision, editing work of the recorded information on the tape after the revision portion has had to be redone over again. Such editing work has had the problem that revising the AV information materials on the tape takes a long time.

BRIEF SUMMARY OF THE INVENTION

It is an object of the present invention to provide an editing control apparatus that enables editing work to be done in a short time on AV information for news programs and the like and, if there is room to edit again, saves the finished edit information and allows easy checking to see if better editing is possible on the basis of the edit information.

The editing control apparatus of the present invention comprises:

an AV information compressing section for accepting various AV information materials, and for compressing the AV information materials;

an AV-information recording section for recording the AV-information materials compressed by the AV information compressing section;

a task control section having means for specifying desired materials from the various input AV-information materials, means for creating an edit decision list (EDL) by arranging the specified materials in the order that the specified materials are to be played back, means for duplicating the thus created EDL, means for recording the duplicated EDL by appending a different name to it, and means for correcting the duplicated EDL;

an EDL information recording section for recording the EDL created by the task control section; and an AV-information expanding section for expanding the compressed AV information based on the EDL created by the task control section.

The editing control method of the present invention comprises:

an AV-information capturing step of compressing various AV-information materials input to an AV-information compressing section, and writing the compressed AV information to an AV-information recording section via an information transfer path;

an AV-information playback step of transferring the compressed AV information, written to the AV-information recording section, to an AV-information expanding section via an information transfer section, and expanding the compressed AV information to recover its original AV-information signal;

an EDL creation step of playing back the AV-information materials recorded in the AV-information recording section, and recording position information of start and end points of necessary AV-information portions in an EDL information recording section;

an EDL duplication step of copying the EDL recorded in the EDL information recording section, and assigning a different name to the copied EDL;

an EDL correction step of altering the EDL recorded in the EDL information recording section; and an EDL playback step of specifying the EDL recorded in the EDL information recording section, and playing back particular event information in the EDL information or the entire event information of the EDL.

According to the present invention, editing of AV information for news programs, etc. is completed by just creating an EDL, achieving a reduction in edit work time, and based on the completed EDL, various EDLs can be generated in a short time and compared for checking; this has the effect of allowing the selection of an optimum EDL in a short time. Furthermore, according to the invention, high-grade AV information editing can be made by selecting the best EDL from among the various EDLs.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
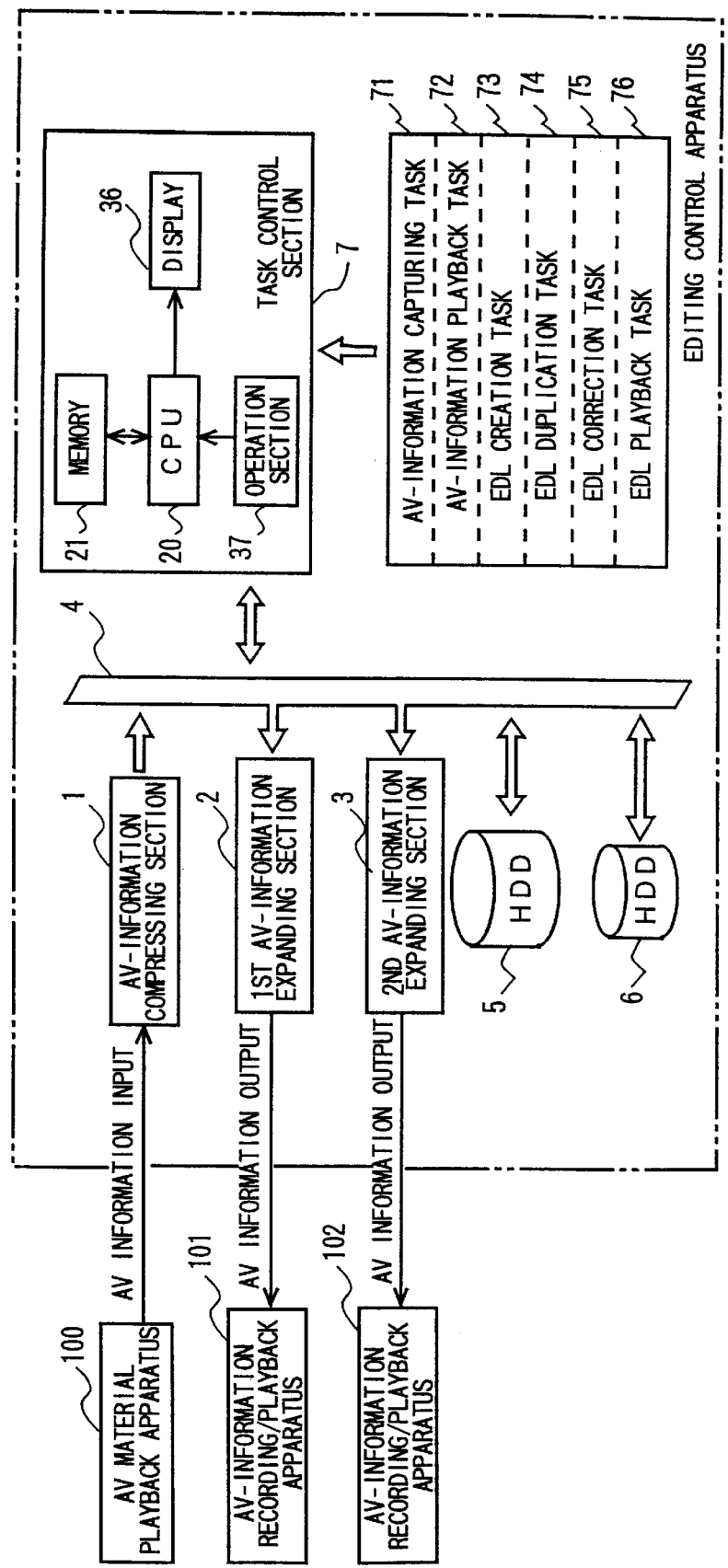
FIG. 1 is a block diagram showing the configuration of an editing control apparatus according to an embodiment of the present invention.

Recently, with advances of an AV-information compression technology, it has become possible to record and play back compressed AV information on a recording medium such as a hard disk. The editing control apparatus of the present invention performs editing by recording compressed AV information on a hard disk.

By using a hard disk drive (hereinafter abbreviated HDD), quick access can be made to any material recorded on the hard disk. When an editing control apparatus equipped with such an HDD is used for editing AV information, a plurality of events can be played back seamlessly by taking advantage of its fast processing speed. In the embodiment hereinafter described, the event represents one unit of image information in AV information, and refers, for example, to image information of one scene.

When an editing work on AV-information materials (events) is performed by using an editing control apparatus equipped with an HDD, a plurality of events can be played back in such a manner that after playing back an event through to its end point (playback end position: P-OUT point), the next event is played back from its start point (playback start position: P-IN point) immediately without interruption. Accordingly, if various pieces of AV information are already recorded on the hard disk in the HDD, then by creating an edit decision list (EDL) containing information on the start and end points of a plurality of edited events arranged in order of playback, any AV information on the basis of the EDL can be played back immediately. Completion of the EDL, therefore, essentially means the completion of the editing work.

The EDL generated in the editing control apparatus of the present invention consists of: playback start positions (P-IN points), playback end positions (P-OUT points), event record start positions (R-IN points), and transition mode information. The playback start position (P-IN points) includes start-point information of events recorded on a recording medium such as a magnetic tape, a magnetic disk, or a magneto-optical disk. The playback end positions (P-IN points) includes end-point information of the events recorded on the recording medium. The transition mode information indicates a change from the immediately previous event to the current event (for example, information indicating a cut at which the entire screen changes from one scene to another instantaneously, and a special effect involving a special transition effect as a wipe or a fade). Since the EDL does not include AV information that requires a large recording area, the amount of information for EDL recorded on the recording medium is small.

Each event of AV information edited by the editing control apparatus of the present invention is recorded on a hard disk by using an HDD, which means that the event start-point and end-point information recorded in the EDL are address information referring to storage locations on the hard disk. The start point information for each edited AV information event recorded on the record tape or other recording medium indicates the start point of the event relative to the position of the first event recorded thereon, which is 0, with the times of subsequently recorded events accumulated up to that event.

In the editing control apparatus of the present invention, a plurality of copies of the generated EDL are created, and a different name is assigned to each copy. Different editing work is performed on each copy of the EDL. As a result, differently modified EDLs are created, while saving the original EDL left intact. The plurality of different EDLs thus created are compared for checking, and the optimum EDL is selected.

When different EDLs are created and stored on the hard disk, as described above, since the amount of information of each EDL is extremely small, the total amount of information required for recording these EDLs on the hard disk is still small.

As described above, in the editing control apparatus of the present invention, since editing of AV information is performed using a hard disk, the work involving the EDL creation, duplication, and selection can be done in a short time, accomplishing the editing of AV information with ease and speedily.

Further, when comparing the plurality of EDLs, corresponding points in the AV information must be repeatedly played back for checking. To achieve this, the editing control apparatus of the present invention incorporates a facility that specifies the corresponding event information for each EDL and records the specified event information on the hard disk so that the AV information corresponding to the specified event information can be played back repeatedly. Accordingly, in the editing control apparatus of the present invention, only designated portions of the plurality of EDLs can be compared and checked easily.

Configuration of Editing Control Apparatus

We will now describe the configuration of the editing control apparatus according to one embodiment of the present invention.

FIG. 1 is a functional block diagram showing the editing control apparatus according to the one embodiment of the present invention. In FIG. 1, there are connected to the editing control apparatus of this embodiment: an AV material playback apparatus 100 (for example, a VCR or the like) loaded with a recording medium, for example, a playback tape on which various pieces of AV information are recorded; and AV-information recording/playback apparatus 101 and 102 (for example, display-incorporated VCRs or the like) each having a display apparatus and loaded with a recording medium on which edited AV information is to be recorded. The editing control apparatus comprises an AV information compressing section 1 to which AV information from the AV material playback apparatus 100 is input, and two AV-information expanding sections 2 and 3 which output AV information. The AV-information compressing section 1 compresses the AV information input from the AV material playback apparatus 100 and outputs the compressed AV information. The first and second AV-information expanding sections 2 and 3 expand the compressed AV information and output the edited AV information which is supplied in a two-channel configuration to the AV-information recording/playback apparatus 101 and 102, respectively.

The editing control apparatus of the present embodiment also includes two hard disk drives (HDDs) 5 and 6. The first hard disk drive 5 (hereinafter referred to as the first HDD 5) is used to record and play back the compressed AV information, while the second hard disk drive 6 (hereinafter referred to as the second HDD 6) contains a hard disk on which control information and EDL information are recorded. Accordingly, the second HDD 6 can do with a smaller storage capacity than the first HDD 5. The AV-information compressing section 1, the first AV-information expanding section 2, the second AV-information expanding section 3, the first HDD 5, and the second HDD 6 are interconnected via an information transfer path (bus) through which data can be transferred among them.

Further, a task control section 7 is connected to the information transfer path 4 so that data can be transferred to and from it. As shown in FIG. 1, the task control section 7 includes a central processing unit (hereinafter abbreviated CPU) 20, a memory 21, a display apparatus 36, and an operation section 37. The task control section 7 carries out an AV-information capturing task 71, an AV-information playback task 72, an EDL creation task 73, an EDL duplication task 74, an EDL correction task 75, and an EDL playback task 76. Control information pertaining to the contents of these tasks are stored on the recording medium in the second HDD 6.

Task Carried out in the Task Control Section

The contents of the tasks carried out in the task control section 7 will be described below.

The AV-information capturing task 71 compresses the various pieces of AV information input into the AV-information compressing section 1, and writes the compressed information to the hard disk in the first HDD 5 via the information transfer path 4.

The AV-information playback task 72 transfers the compressed AV information, which is written to the hard disk in the first HDD 5, to the first AV-information expanding section 2 or the second AV-information expanding section 3 via the information transfer path 4. And the AV-information playback task 72 expands the compressed AV information to recover the original AV-information signal. In the present embodiment, the first AV-information expanding section 2 and the second AV-information expanding section 3 are configured to provide two channels for AV information output.

In the EDL creation task 73 plays back AV information recorded on the hard disk in the first HDD 5, the start point (P-IN point) and end point (P-OUT point) of the necessary AV-information material (event) are specified, and the resulting address information is recorded as event information on the hard disk in the second HDD 6. The thus recorded event information is sorted in the task control section 7 into the desired order, thereby creating an EDL. The created EDL thus is assigned a name and stored on the second HDD 6.

The EDL duplication task 74 produces a duplicate of the EDL created by the EDL creation task 73 and stored on the second HDD 6, as well as stores the duplicated EDL on the second HDD 6 by assigning it a different name.

The EDL correction task 75 is performed to alter the contents of the EDL stored on the second HDD 6; for example, the task performs correction work such as replacing an event in the EDL by a different event or changing the event playback sequence recorded in the EDL.

The EDL playback task 76 specifies an EDL stored on the second HDD 6, selects particular event information or the entire event information in the EDL, and plays back the corresponding AV information for display on the display apparatus of the AV-information recording/playback apparatus 101 and 102 connected to the AV-information expanding sections 2 and 3. The EDL playback task 76 can also specify a particular portion of the EDL, record the particular portion on the second HDD 6 as playback specification information, and play back only that particular portion repeatedly on the AV-information recording/playback apparatus 101 and 102. It is also possible to specify different playback portions from different EDLs for the two AV-information expanding sections 2 and 3 and simultaneously play back different AV-information portions on the two channels.

The above tasks are carried out by the CPU 20 using programs stored on the second HDD 6.

Creation of EDL

Figure 2:
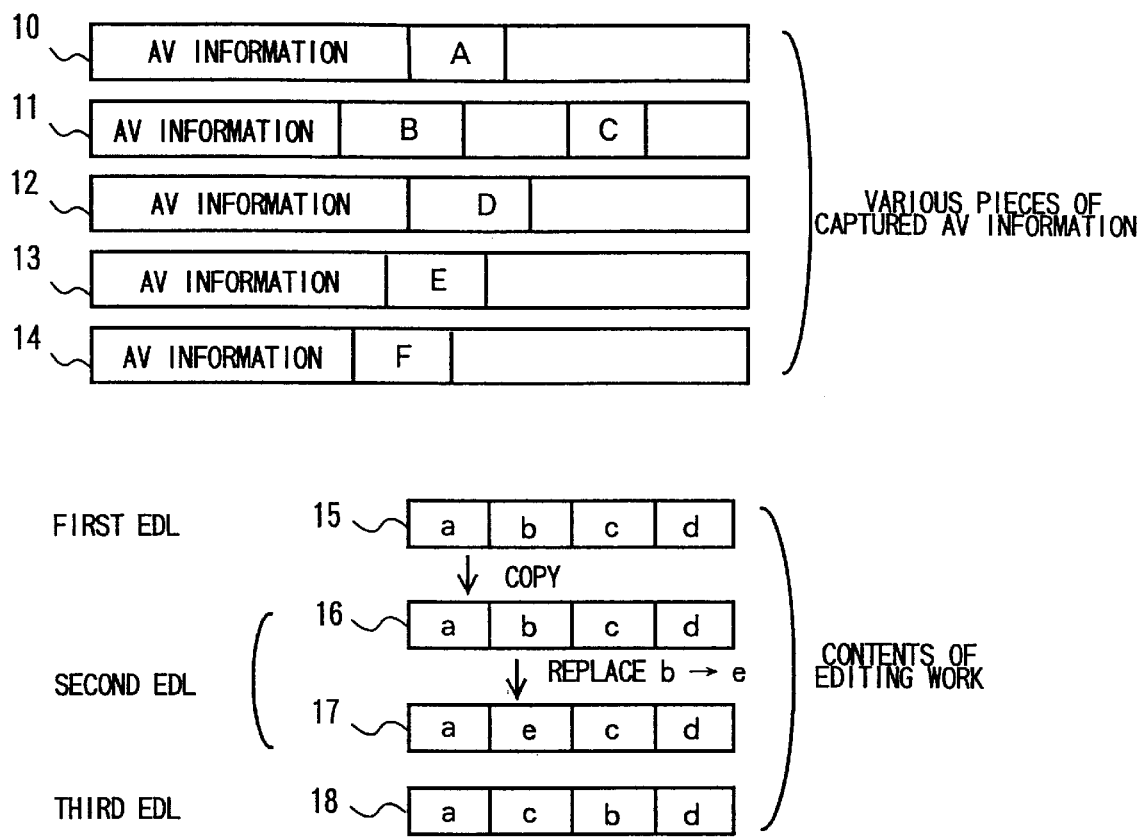
FIG. 2 is a diagram showing examples of various pieces of AV information and examples of AV-information materials edited using the editing control apparatus according to an embodiment of the present invention.

FIG. 2 shows various pieces of AV information 10, 11, 12, 13, and 14, which are captured by the editing control apparatus of the present embodiment, and various EDLs created by editing these pieces of AV information.

In the above-described AV-information capturing task 71, the various pieces of AV information 10 to 14, which are inputted from the AV material playback apparatus 100, are compressed by the AV-information compressing section 1 and stored on the first HDD 5. Signs A, B, C, D, E, and F in the various pieces of AV information 10 to 14 shown in FIG. 2, indicate the events selected in the respective pieces of AV information.

The EDL 15 shown in FIG. 2 indicates that the events A, B, C, and D have been edited so they will be played back in the order of a-b-c-d. This EDL 15 is named the first EDL. The information (a-b-c-d) in the first EDL 15 is information specifying the order in which the events are to be played back; that is, the address information for the start point (P-IN point) and end point (P-OUT point) of each event in the AV information, and the transition mode information for each event are listed in the order that the events are to be played back. Since no AV information is included in the information (a-b-c-d) in the first EDL 15, the amount of information required is small.

The EDL 16 shown in FIG. 2 is copied from the first EDL 15. Therefore, the contents of the EDL 16 are the same as the contents of the EDL 15, and the amount of information of the EDL 16 is also small. As a result, this duplication work finishes in a short time.

In FIG. 2, the second EDL 17 is created by replacing event information b in the EDL 16 by event information e. This replacing work only requires changing the start point (P-IN point), end point (P-OUT point), etc. constituting the event information b corresponding to the event B, and can therefore be done in a short time.

The third EDL 18 is created by work similar to the replacing work done on the second EDL 17, that is, by interchanging the event B with the event C in the first EDL 15.

The replacing work done on the second EDL 17 and the interchange work done on the third EDL 18 can be accomplished by simple operation in a short time. The thus created first EDL 15, second EDL 17, and third EDL 18 are stored on the second HDD 6. Based on the first EDL 15, second EDL 17, and third EDL 18, the corresponding AV information stored on the first HDD 5 is played back on the AV-information recording/playback apparatus 101 and 102, and the optimum EDL is selected.

Edit Mode in EDL Creation

Figure 3:
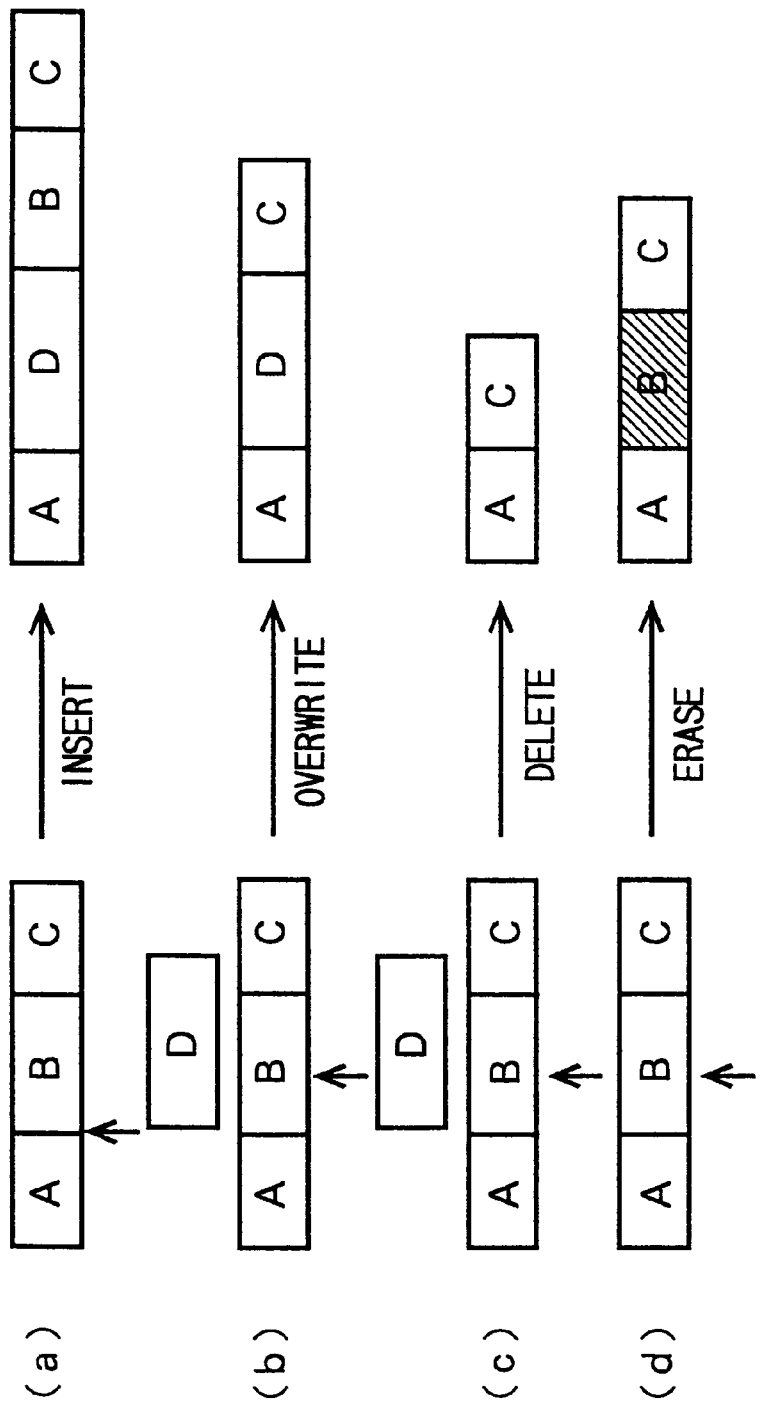
FIG. 3 shows the details of various edit modes in EDL creation using the editing control apparatus according to an embodiment of the present invention.

FIG. 3 shows the details of various edit modes in EDL creation. FIG. 3(a) shows an insert mode, illustrating an example in which material D is inserted between A and B in AV information A-B-C. FIG. 3(b) shows an overwrite mode, illustrating an example in which the material D is written over the material B in the AV information A-B-C. In this overwrite mode, if the data length of the material D is longer than that of the material B, the former is written over the latter by deleting the excess portion of the former; conversely, if the data length of the material D is shorter than that of the material B, the remaining portion of the material B is listed on the EDL as it is. FIG. 3(c) shows a delete mode, illustrating an example in which the material B is deleted from the AV information A-B-C. FIG. 3(d) shows an erase mode, illustrating an example in which the material B in the AV information A-B-C is erased. In this erase mode, the material B is removed, leaving a space where nothing is displayed on the screen.

Example of the Editing Control Apparatus

Figure 4:
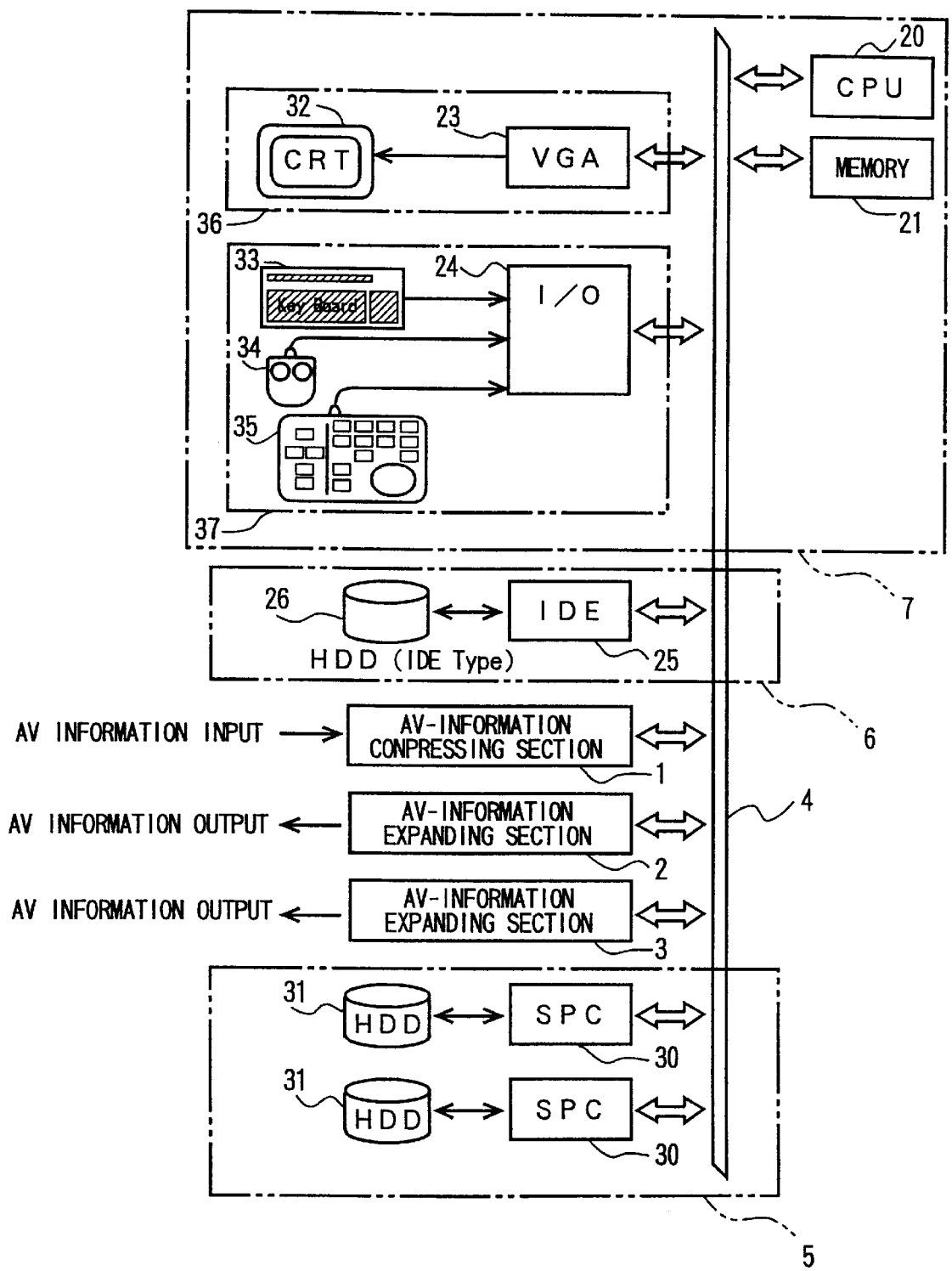
FIG. 4 is a diagram showing an example of the hardware configuration of the editing control apparatus according to an embodiment of the present invention.

FIG. 4 shows a specific example of the hardware configuration of the editing control apparatus according to the present invention.

As shown in FIG. 4, the task control section 7 includes the CPU 20, memory 21, display apparatus 36, and operation section 37, which are connected to an information transfer path 22 so that data can be transferred via the information transfer path 22. Based on the control information stored on a hard disk drive 26, the CPU 20 carries out the AV-information capturing task 71, AV-information playback task 72, EDL creation task 73, EDL duplication task 74, EDL correction task 75, and EDL playback task 76 previously described.

The information transfer path 4 connected to the CPU 20 provides an internal connection for information transfer, for which a PCI bus (Peripheral Component Interconnect bus), an EISA bus (Extended Industry Standard Architecture bus), or an ISA bus (industry standard architecture bus) can be used. Information transfer between the respective blocks is performed using the information transfer path 4 under control of the CPU 20.

The memory 21 has a recording medium with 24 MB (megabytes) to 32 MB of storage capacity, and stores various kinds of information when the CPU 20 carries out each task.

The display apparatus 36 has a display (CRT) 32 and a video graphics adapter (VGA) 23 which is connected to the information transfer path 4. The VGA 23 connected to the information transfer path 4 is a converter for displaying control information from the CPU 20 onto the display 32. The VGA 23 produces video signal for display on the display 32. The display 32 displays various kinds of information about the processing performed in the CPU 20, on its screen.

The operation section 37 includes an I/O unit 24 connected to the information transfer path 4, and a keyboard 33, a mouse 34, and an editing control panel 35 connected to the I/O unit 24. The keyboard 33 is used to enter the EDL name, task command, etc. The mouse 34 is used to move an arrow mark, etc. on the screen of the display 32 and enter a task command, etc.

The editing control panel 35 is a control unit specially designed for editing work, and is used for purposes such as entering task commands. The editing control panel 35 is equipped with special keys used to perform editing work. These keys include, for example, an upload button, an edit button, a download button, and a control dial. The upload button is used to capture AV information and record it on the hard disk drive (HDD). The edit button is used when doing edits; by using this button, the editor can record the start point and end point of AV information by button operation only. The download button is used to output AV information to the external recording/playback apparatus such as a VCR in accordance with an edited EDL.

An interface unit 25 for the second HDD 6 is, for example, an IDE (Integrated Drive Electronics) interface unit, allowing the connection of an IDE hard disk drive (HDD) 26.

The hard disk drive 26 stores created EDLs as well as control information necessary for carrying out the AV-information capturing task 71, AV-information playback task 72, EDL creation task 73, EDL duplication task 74, EDL correction task 75, and EDL playback task 76.

The first HDD 5 also is connected to the information transfer path 4 in the present embodiment. The interface unit 30 for the first HDD 5 is, for example, an SPC (SCSI Protocol Control) interface unit, and acts as a converter for adapting information from the information transfer path 4 so that the information can be recorded on a hard disk drive (HDD) 31. The interface unit 30 in the present embodiment thus allows the connection of the SCSI (small computer system interface) hard disk drive (HDD) 31.

The SCSI hard disk drive 31 is a recording medium to be used for recording AV information. Such hard disk drives, each with the interface unit 30, are installed in the quantity required to process the AV information.

The AV-information compressing section 1 also is connected to the information transfer path 4 in the present embodiment. The AV-information compressing section 1 compresses the input AV information and transfers it to the memory 21 via the information transfer path 4. The compressed AV information in the memory 21 thus is transferred, under direction of the CPU 20, from the memory 21 to the specified hard disk drive 31 in the first HDD 5 for recording thereon.

The first AV-information expanding section 2 expands the compressed AV information, which is read out of the hard disk drive 31, into the original AV-information signal for output.

The second AV-information expanding section 3, like the first AV-information expanding section 2, expands the compressed AV information into the original AV-information signal for output, thus achieving two-channel simultaneous recording/playback in combination with the first AV-information expanding section 2.

Explanation of Various Editing Tasks

Next, we will describe the various editing tasks performed in the editing control apparatus of the present embodiment with reference to accompanying drawings.

AV-Information Capturing Task

Figure 5:
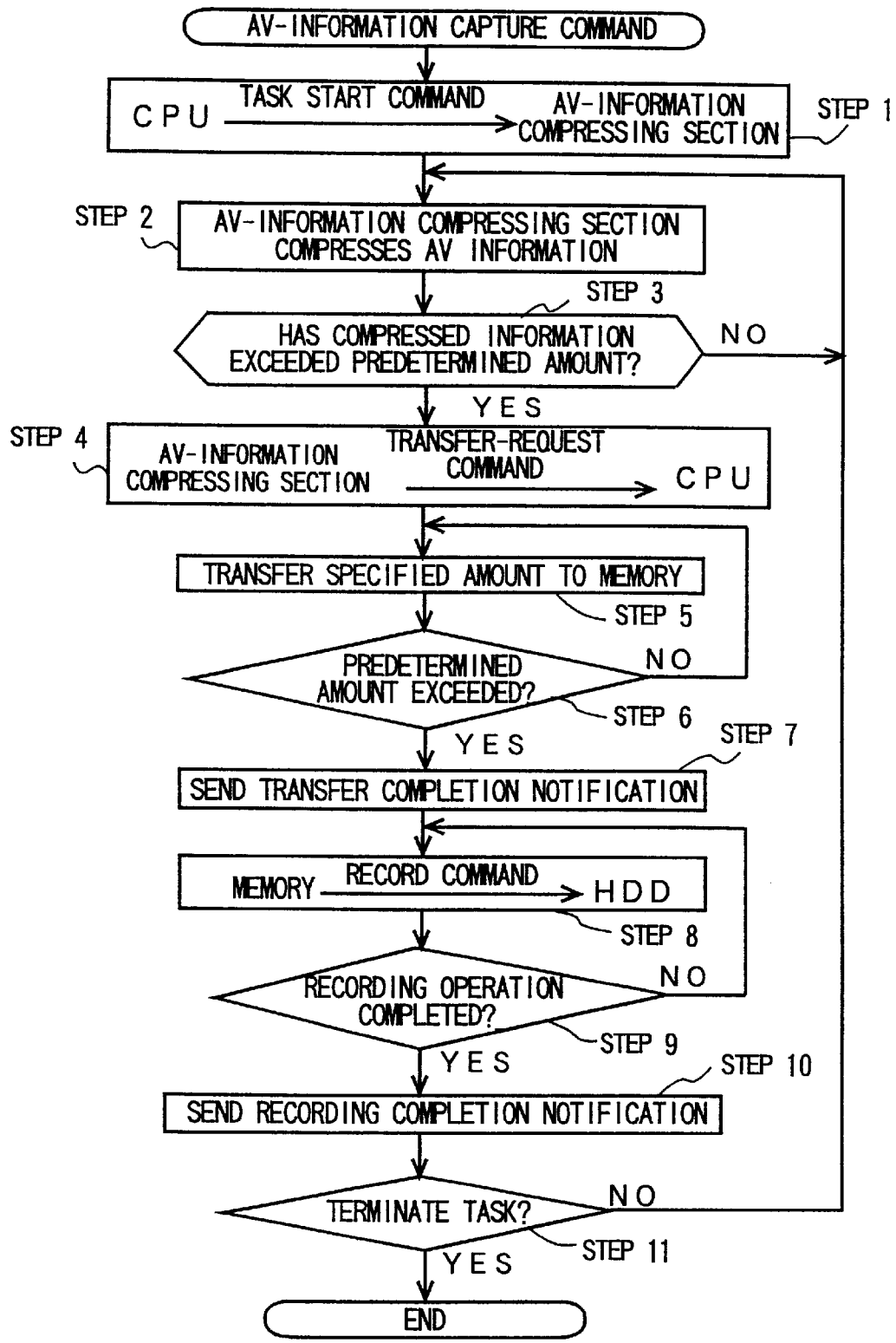
FIG. 5 is a flow chart illustrating an AV-information capturing task in the editing control apparatus of the present invention.

FIG. 5 is a flow chart illustrating the AV-information capturing task 71 in the editing control apparatus of the present embodiment.

When an AV-information capture command is input to the CPU 20 by key operation, etc. from the operation section 37 (using the keyboard 33, the mouse 34, or the editing control panel 35), the CPU 20 issues a task start command to direct the AV-information compressing section 1 so as to start the AV-information capturing task (step 1). In response to the task start command, the AV-information compressing section 1 compresses the input AV information (step 2), and stores it in an internal memory of the AV-information compressing section 1. When the amount of the compressed information exceeds a predetermined amount (step 3), the AV-information compressing section 1 sends a transfer-request command to the CPU 20 (step 4). In response to the transfer-request command, the CPU 20 issues a command to the AV-information compressing section 1 so as to transfer a specified amount of compressed information to the specified location in the memory 21. In compliance with this command, the AV-information compressing section 1 transfers the specified amount of compressed AV information (step 5). When the transfer operation is completed, the AV-information compressing section 1 sends a transfer completion notification to the CPU 20 (step 7). During this transfer operation also, the AV-information compressing section 1 continues to compress the AV information as it is input.

Next, the CPU 20 issues a command to the interface unit 30 so as to record the information, which is read from the specified location in the memory 21, at the specified location on the hard disk in the hard disk drive 31 (step 8).

Upon receipt of this command, the interface unit 30 carries out the recording operation. And the recording operation is completed, the interface unit sends a recording completion notification to the CPU 20 (step 10).

When the AV-information compressing section 1 again sends a transfer-request command to the CPU 20, the above recording operation is repeated. When the amount of information, which is specified in advance by key operation, etc. of the keyboard 33, the mouse 34, or the editing control panel 35, has been captured, or when an operation to terminate the task is done using the keyboard 33, mouse 34, or editing control panel 35, the CPU 20 issues a task-terminate command to the AV-information compressing section 1, thus terminating the task.

The compressed AV information generated by the AV-information compressing section 1 in a predetermined time is recorded at high speed on the recording medium in the hard disk drive 31 within that predetermined time. Here, the AV-information compressing section 1 and the hard disk drive 31 are equipped with necessary capacities to prevent situations where compressed information overflows and dropouts occur in the information recorded on the hard disk drive 31.

AV-Information Playback Task

Figure 6:
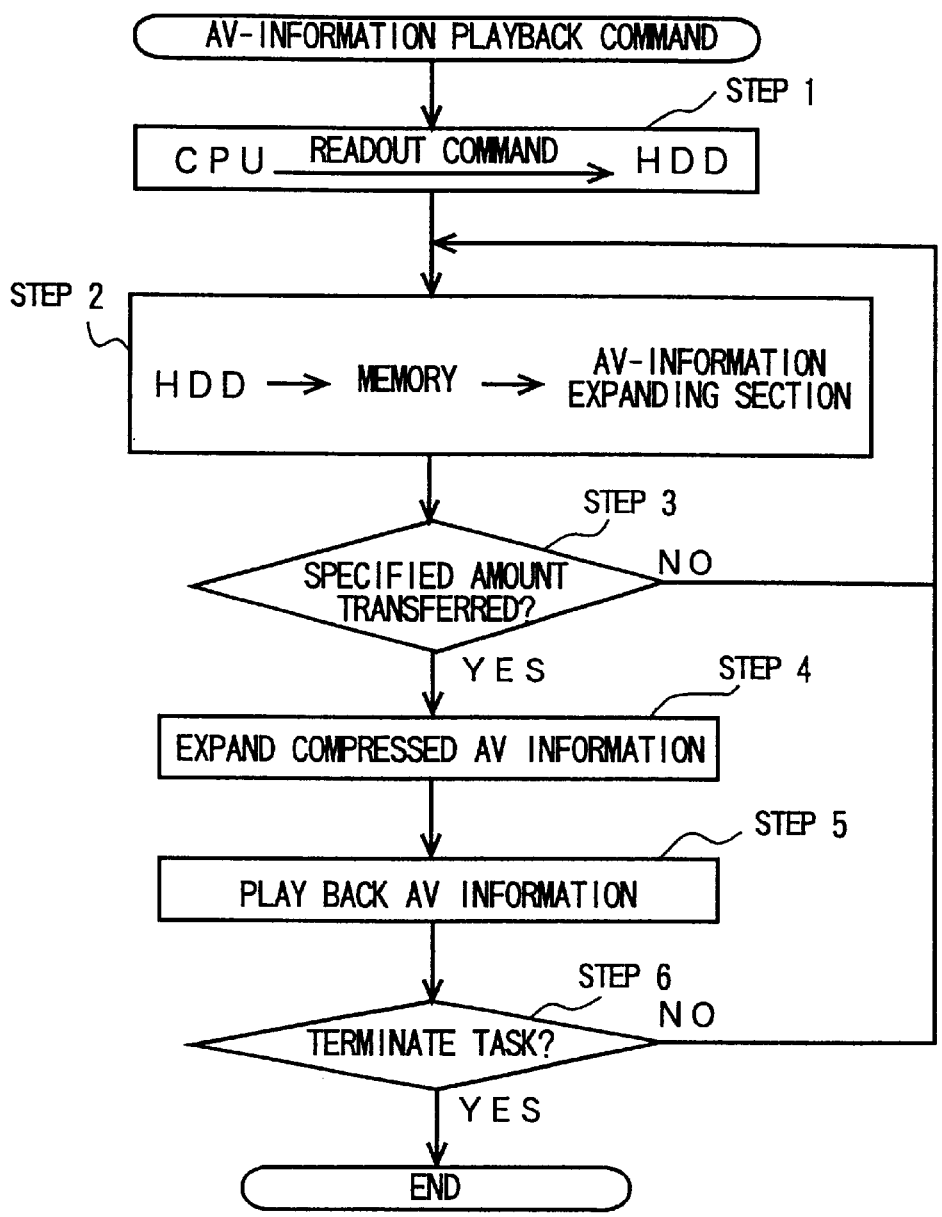
FIG. 6 is a flow chart illustrating an AV-information playback task in the editing control apparatus of the present invention.

FIG. 6 is a flow chart illustrating the AV-information playback task 72 in the editing control apparatus of the present embodiment.

In the AV-information playback task 72, starting of the task is directed by specifying the location on the recording medium at which the AV information to be played back is recorded, by key operation, etc. from the operation section 37. Termination of the task also is directed by key operation, etc. from the operation section 37. In the AV-information playback task 72, when the CPU 20 receives an AV-information playback command, the CPU 20 issues a readout command to the hard disk drive 31 (step 1). In response to the readout command, the hard disk drive 31 reads the compressed AV information from the specified location on the hard disk, and stores it temporarily in the memory 21. The compressed AV information stored in the memory 21 is then transferred to the first AV-information expanding section 2 or the second AV-information expanding section 3 (step 2). At this time, the information to be transferred is divided into blocks of predetermined amount, and these blocks of information are transferred successively.

The compressed AV information is expanded in the first AV-information expanding section 2 or the second AV-information expanding section 3 (step 4), and the expanded AV information is played back on the AV-information recording/playback apparatus 101 or 102 (step 5). When the amount of information, which is specified by key operation, etc. of the operation section 37 in advance, has been read out, or when an operation to terminate the task is done, the CPU 20 issues a readout stop command to the hard disk drive 31, thus terminating the AV-information playback task.

EDL Creation Task

Figure 7:
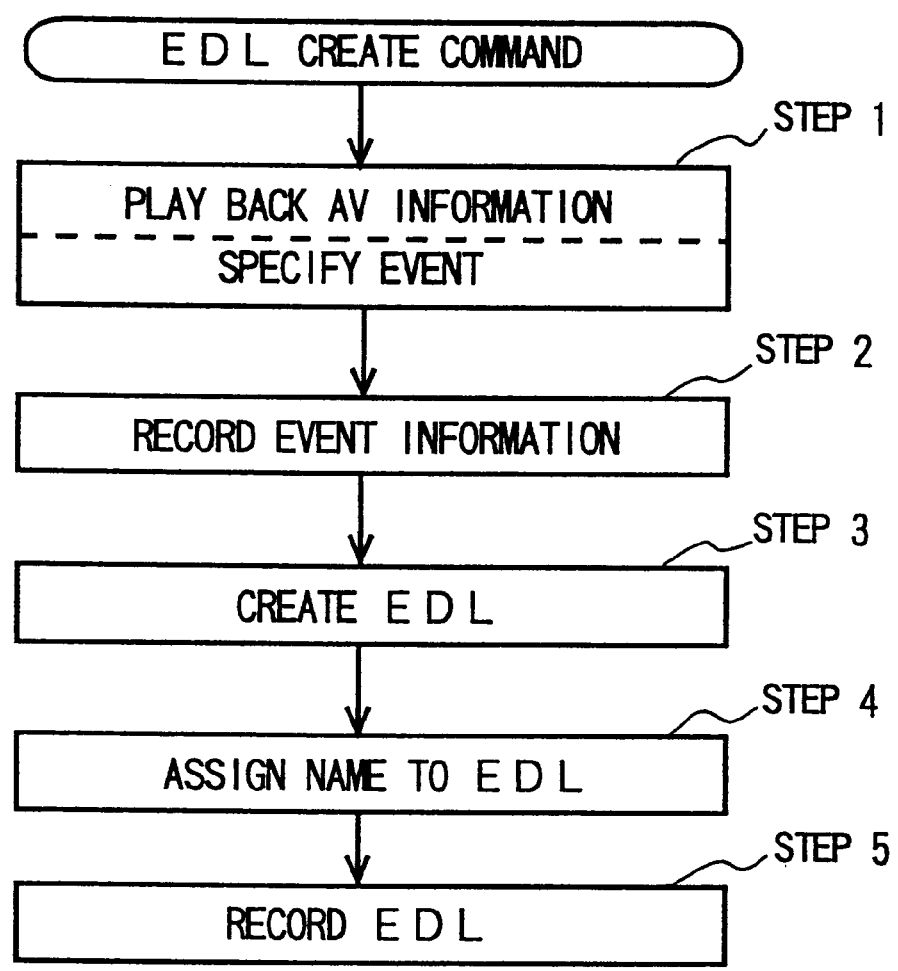
FIG. 7 is a flow chart illustrating an EDL creation task in the editing control apparatus of the present invention.

FIG. 7 is a flow chart illustrating the EDL creation task 73 in the editing control apparatus of the present embodiment.

The EDL creation task 73 involves specifying a plurality of events in AV information, and listing the position information and the transition mode information in prescribed order. The position information includes the start and end points of the events, and position data (cumulative time of the events) of the recording medium (magnetic tape, magnetic disk, magneto-optical disk, etc.) on which edited AV information is to be recorded. The transition mode information indicates a change from the immediately previous event to the current event (for example, information indicating a cut at which the entire screen changes from one scene to another instantaneously, or a special transition effect such as a wipe or a fade). In the EDL creation task, while AV information stored on the hard disk drive 31 is being played back on the AV-information recording/playback apparatus 101 or 102, the start and end points of each necessary event selected from the AV information are specified by key operation, etc. from the operation section 37 (step 1). The event information of the specified event is recorded on the hard disk drive 26 (step 2). This operation is repeated until all the necessary event information is stored on the hard disk drive 26. The event information recorded on the hard disk in the hard disk drive 26 is sorted in prescribed order, and a transition mode between events is set, thus creating an EDL (step 3).

Usually, the transition mode information is automatically set to a cut mode (a mode effecting an instantaneous change of the entire screen from one scene to another). When specifying a special effect mode (for example, a fade, wipe, etc.), the mode is manually set by key operation, etc. from the operation section 37. The position information of the start and end points of each event in the EDL is recorded on the hard disk in the hard disk drive 26 when the information is input. The thus created EDL is automatically assigned a new name (for example, the first EDL) (step 4). It is also possible to specify the EDL name manually by operation from the operation section 37. The EDL with the new name is stored on the hard disk drive 26 (step 5).

EDL Duplication Task

Figure 8:
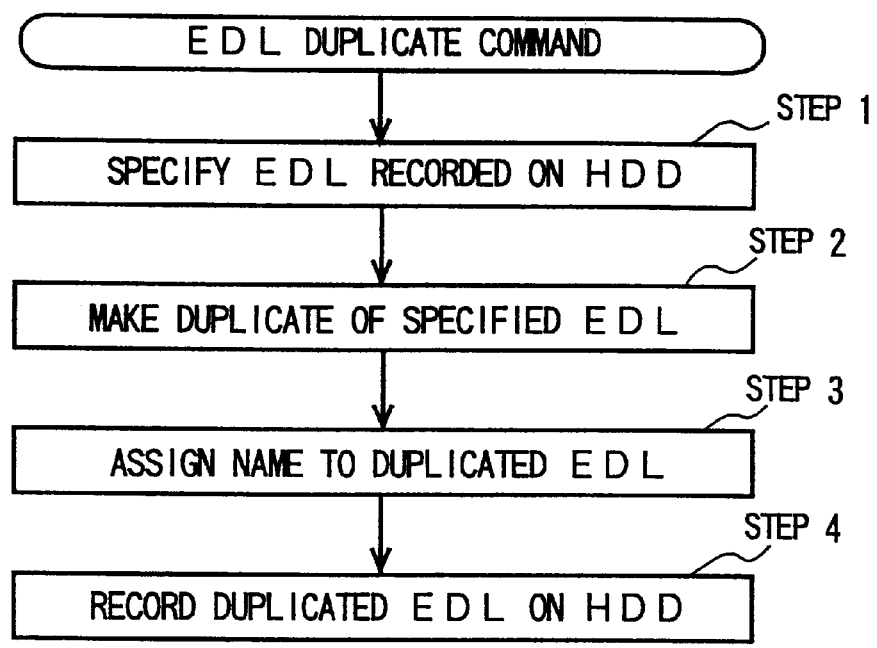
FIG. 8 is a flow chart illustrating an EDL duplication task in the editing control apparatus of the present invention.

FIG. 8 is a flow chart illustrating the EDL duplication task 74 in the editing control apparatus of the present embodiment.

In the EDL duplication task 74, an EDL recorded on the hard disk drive 26 is specified by key operation, etc. using the keyboard 33, mouse 34, or editing control panel 35 in the operation section 37 (step 1). A duplicate of the specified EDL is made (step 2), and the duplicated EDL is assigned a different (specified) name (step 3). Next, the duplicated EDL with the new name is recorded on the hard disk drive 26 (step 4).

EDL Correction Task

Figure 9:
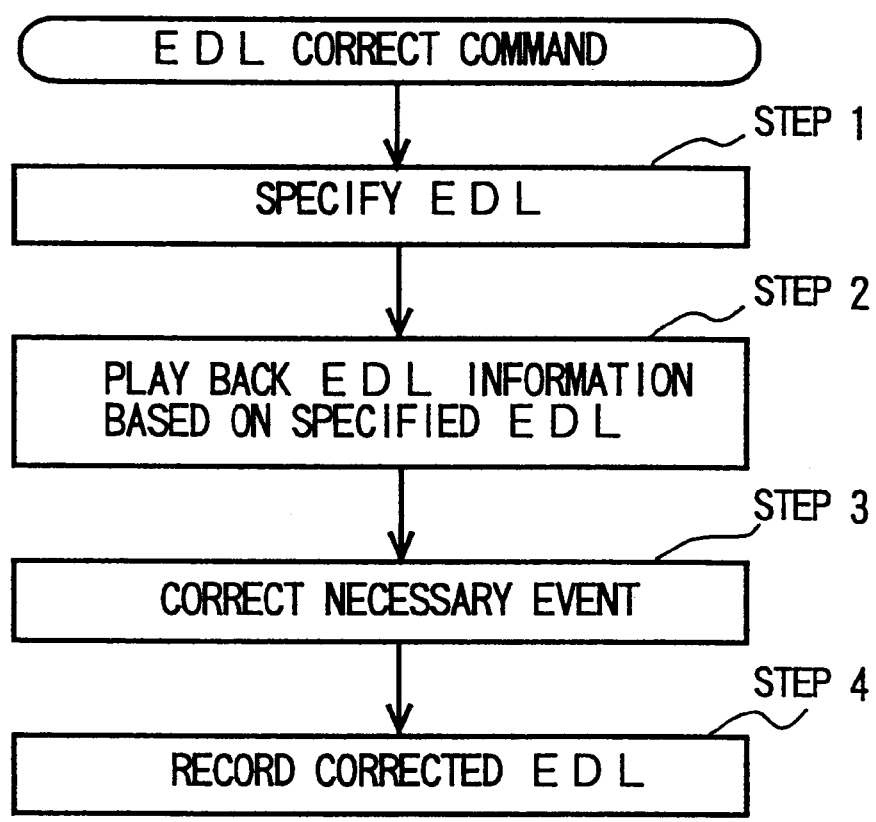
FIG. 9 is a flow chart illustrating an EDL correction task in the editing control apparatus of the present invention.

FIG. 9 is a flow chart illustrating the EDL correction task 75 in the editing control apparatus of the present embodiment. The EDL correction task 75 is performed to correct all or part of the specified EDL.

First, an EDL recorded on the hard disk drive 26 is specified (step 1). Based on the specified EDL, previously edited AV information is played back and checked (step 2). Next, the previously edited EDL is displayed on the display apparatus 36, and correction work is performed by key operation, etc. of the operation section 37 so as to replace a specified event by a different event, to interchange the order of specified events, etc. (step 3). The corrected EDL is recorded on the hard disk drive 26 (step 4).

EDL Playback Task

Figure 10:
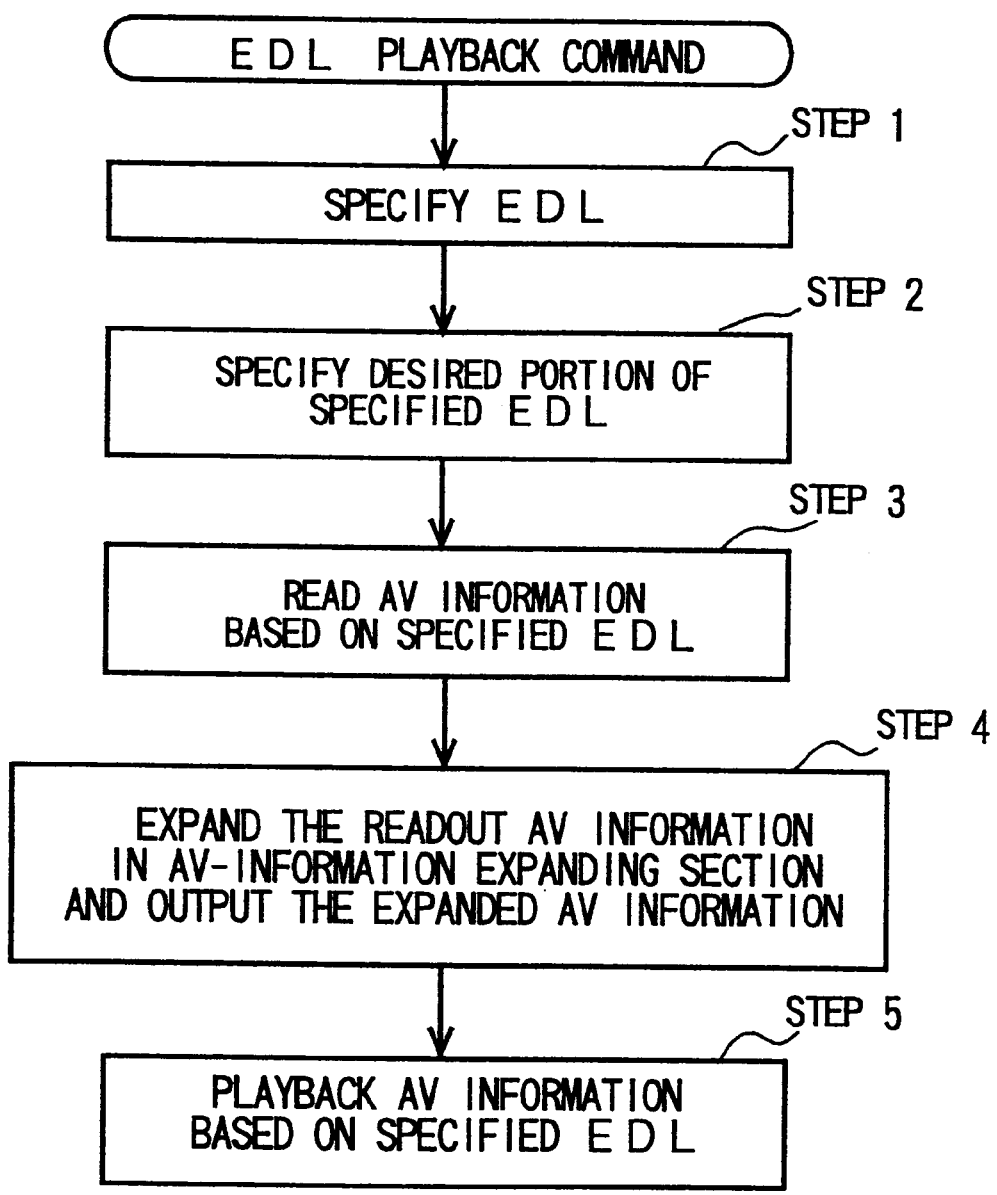
FIG. 10 is a flow chart illustrating an EDL playback task in the editing control apparatus of the present invention.

FIG. 10 is a flow chart illustrating the EDL playback task 76 in the editing control apparatus of the present embodiment. The EDL playback task 76 is performed to play back only a specified portion of the EDL recorded on the hard disk drive 26.

First, an EDL recorded on the hard disk drive 26 is specified (step 1). Next, in step 2, only a portion that needs to be played back from the specified EDL is specified. These operations for specifying are performed using the keyboard 33, mouse 34, or editing control panel 35 in the operation section 37. The specified portion in the specified EDL is expanded by the selected AV-information expanding section 2 or 3 (step 4), and played back on the AV-information recording/playback apparatus 101 or 102 (step 5).

In the above embodiment, playback of AV information is performed using the AV-information recording/playback apparatus 101 and 102 external to the editing control apparatus, but the editing control apparatus of the present invention is not restricted to the illustrated configuration. For example, the editing control apparatus may be configured so that the AV information from the AV-information expanding section is input into the task control section 7 and played back for display on the display apparatus 36 in the task control section 7. When the editing control apparatus of the present invention is configured in such a manner, EDL editing work can be done within the editing control apparatus of the present invention without having to use external recording/playback apparatus.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An editing control apparatus comprising:

an AV-information compressing section for accepting various AV-information materials, and for compressing said AV-information materials;

an AV-information recording section for recording said AV-information materials compressed by said AV-information compressing section;

a task control section having means for specifying desired materials from the various input AV-information materials, means for creating an edit decision list (EDL) by arranging the specified materials in the order that said specified materials are to be played back, means for duplicating the thus created EDL, means for recording the duplicated EDL by appending a different name to it, means for correcting the duplicated EDL, and means for simultaneously reproducing at least a portion of the AV information specified by the uncorrected EDL and at least a portion of the AV information specified by the corrected EDL;

an EDL information recording section for recording the EDL created by said task control section; and an AV-information expanding section for expanding said compressed AV information based on the EDL created by said task control section.

2. An editing control apparatus according to claim 1, wherein said task control section includes a recording medium holding programs for carrying out an AV-information capturing task, an AV-information playback task, an EDL creation task, an EDL duplication task, an EDL correction task, and an EDL playback task.

3. An editing control apparatus according to claim 2, further comprising means for specifying at least a portion in a plurality of recorded EDLs, and means for playing back the specified portion in a specified EDL.

4. An editing control apparatus according to claim 3, further comprising means for simultaneously playing back the specified portion in a plurality of specified EDLs.

5. An editing control apparatus according to claim 1, wherein creation of the EDL in said task control section is performed using an editing control panel.

6. An editing control method comprising:

an AV-information capturing step of compressing various AV-information materials input to an AV-information compressing section, and writing the compressed AV information to an AV-information recording section via an information transfer path;

an AV-information playback step of transferring the compressed AV information, written to said AV-information recording section, to an AV-information expanding section via an information transfer section, and expanding the compressed AV information to recover its original AV-information signal;

an EDL creation step of playing back the AV-information materials recorded in said AV-information recording section, and recording position information of start and end points of necessary AV-information portions in an EDL information recording section;

an EDL duplication step of copying the EDL recorded in the EDL information recording section, and assigning a different name to the copied EDL;

an EDL correction step of altering the EDL recorded in said EDL information recording section; and an EDL playback step of specifying the EDL recorded in said EDL information recording section, and playing back particular event information in the EDL information or the entire event information of the EDL.

7. An editing control method according to claim 6, further including a task for duplicating a created EDL and recording the duplicated EDL with a new name assigned to it, and a task for correcting the duplicated EDL.

8. An editing control method according to claim 7, further including the steps of: specifying at least a portion in the recorded EDL; and playing back the specified portion in the specified EDL.

9. An editing control method according to claim 8, further including the step of simultaneously playing back the specified portion in a plurality of specified EDLs.

* * * * *